US012576577B2

(12) United States Patent
Fleischmann et al.

(10) Patent No.: US 12,576,577 B2
(45) Date of Patent: Mar. 17, 2026

(54) BLOW-MOLDING MACHINE WITH DETECTION OF A LOCKING STATE

(71) Applicant: KRONES AG, Neutraubling (DE)

(72) Inventors: Hans-Juergen Fleischmann, Steinberg am See (DE); Thomas Hoellriegl, Teublitz (DE)

(73) Assignee: KRONES AG, Neutraubling (DE)

( * ) Notice: Subject to any disclaimer, the term of this patent is extended or adjusted under 35 U.S.C. 154(b) by 151 days.

(21) Appl. No.: 18/518,763

(22) Filed: Nov. 24, 2023

(65) Prior Publication Data

US 2024/0165867 A1 May 23, 2024

(30) Foreign Application Priority Data

Nov. 23, 2022 (DE) ...................... 20 2022 106 566.7

(51) Int. Cl.
| | |
|---|---|
| *B29C 49/80* | (2006.01) |
| *B29C 49/36* | (2006.01) |
| *B29C 49/42* | (2006.01) |
| *B29C 49/56* | (2006.01) |
| *B29L 31/00* | (2006.01) |

(52) U.S. Cl.
CPC .............. *B29C 49/80* (2013.01); *B29C 49/36* (2013.01); *B29C 49/42382* (2022.05); *B29C 2049/5661* (2022.05); *B29L 2031/7158* (2013.01)

(58) Field of Classification Search
CPC ... B29C 49/42382; B29C 49/56; B29C 49/78; B29C 49/36; B29C 49/80; B29C 49/5602; B29C 2949/0715; B29C 2049/5661; B29C 2049/7878; B29C 49/42403; B29L 2031/7158
See application file for complete search history.

(56) References Cited

U.S. PATENT DOCUMENTS

2014/0151940 A1 6/2014 Philipp et al.

FOREIGN PATENT DOCUMENTS

| CN | 105538663 A | 5/2016 |
|---|---|---|
| EP | 3431253 A1 | 1/2019 |
| KR | 10-2017-0134100 | 12/2017 |

OTHER PUBLICATIONS

EP Extended Search Report issued in EP 23210587.4, with machine translation, dated Apr. 16, 2024, 8 pgs.

*Primary Examiner* — Monica A Huson
(74) *Attorney, Agent, or Firm* — HAYES SOLOWAY P.C.

(57) ABSTRACT

An apparatus for forming plastic preforms into plastic containers, including a rotatable carrier on which a plurality of forming stations for forming the plastic preforms into plastic containers are arranged. The forming stations each have application devices for applying a flowable medium to expand the plastic preforms. The forming stations each have blow mold carriers on which blow molds are arranged, within which the plastic preforms are formed into plastic containers. A first movement mechanism is provided for opening and/or closing the blow molds, and wherein a locking mechanism is provided for locking the blow molds together at least temporarily during the expansion process. The apparatus has at least one sensor device which detects a locking state of the locking mechanism of at least one forming station and which outputs at least one signal which is characteristic of said locking state.

20 Claims, 2 Drawing Sheets

4

9

42

94

95

90

93

42

92

BLOW-MOLDING MACHINE WITH DETECTION OF A LOCKING STATE

BACKGROUND OF THE INVENTION

The present invention relates to an apparatus for forming plastic preforms into plastic containers. Such apparatuses and methods have long been known from the prior art. In this process, plastic preforms are usually fed into blow molds and applied with a flowable and, in particular, gaseous medium. This process is relatively complicated and usually also comprises the stretching of the plastic preforms by means of a stretching rod. Specifically, heated plastic preforms are fed into blow molds, which are then closed and locked, and then the plastic preforms are expanded. After this process, the blow mold is unlocked again, opened, and the containers produced are removed.

During operation of such apparatuses, it can happen for various reasons that the blow mold is not properly locked. In the prior art, an emergency stop of the machine is initiated in these cases. The cause of this locking fault is often a poorly transferred plastic parison which had become clamped between the two mold halves. The emergency stop is intended to prevent machine damage.

However, the interruption of the production process has the consequence that the plastic preforms, which are pre-treated and, in particular, heated in the heating module for production, become unusable for container production. In this way, not only machine availability but also efficiency are reduced by this interruption. Plastic preforms that are unusable must be disposed of.

In addition, this interruption also ties up manpower and may even affect the availability of an entire line.

It is thus the object of the present invention to increase machine efficiency, in particular, even in the event of such malfunctions.

SUMMARY OF THE INVENTION

An apparatus according to the invention for forming plastic preforms into plastic containers has a rotatable carrier on which a plurality of forming stations for forming the plastic preforms into plastic containers are arranged, wherein the forming stations each have application devices for applying a flowable medium to the plastic preforms for the expansion thereof, and wherein the forming stations each have blow mold carriers on which blow molds can be arranged and within which the plastic preforms can be formed into plastic containers and wherein a first movement mechanism is provided for opening and/or closing the blow molds and wherein a locking mechanism is further provided for locking the blow mold carriers together at least temporarily during the expansion process of the plastic preforms and, in particular, for locking such that the blow molds are held in a closed state by the locking mechanism.

According to the invention, the apparatus has at least one sensor device and/or a detection device which detects a locking state of the locking mechanism of at least one forming station and which outputs at least one signal that is characteristic of this locking state.

In particular, the sensor device can determine whether the blow mold carriers and/or the blow molds are properly locked and, in particular, that the blow mold is therefore properly closed.

It is therefore proposed to detect by means of a sensor device, if appropriate, even by means of a plurality of sensor devices, whether the forming station(s) is/are properly locked. The state of the locking enables a conclusion as to whether the blow mold is properly closed, which in turn is a precondition of proper performance of a blow-molding process.

Particularly preferably, the forming stations each have stretching rods to stretch the plastic preforms in their longitudinal direction. These stretching rods are preferably inserted into the plastic preforms during the expansion process and stretch the plastic preforms in their longitudinal direction. Preferably, the stretching rods are therefore moved at least temporarily along their longitudinal direction during the expansion process.

The application device is, in particular, a blow nozzle which can be placed against the mouths of the plastic preforms in order to apply the flowable medium to them.

Particularly preferably, the blow molds have several blow mold parts, and, in particular, at least two side parts and a bottom part.

The apparatus preferably has a supply device and, in particular, a supply starwheel or a supply wheel which supplies the plastic preforms to the forming stations. Particularly preferably, the apparatus has a discharge device and in particular a discharge wheel or a discharge starwheel, which removes the produced containers from the forming stations.

The function described here is intended to reduce machine downtime, prevent scrap and tie up less manpower.

Particularly preferably, the blow mold side parts are arranged on blow mold carriers and at least one blow mold side part and preferably, these two blow mold side parts can be pivoted for closing and opening the blow molds. It would also be conceivable for a blow mold side part to be arranged in a stationary manner with respect to the blow-molding wheel. In a preferred embodiment, a movement mechanism is provided for moving the mold carrier halves. Particularly preferably, this movement mechanism is formed by a system of guide cams, rollers, and/or levers.

When a blow mold is open, the supply device, for example an inlet starwheel, transfers a plastic parison to the blow mold and the discharge device, i.e. the outlet starwheel, removes the finished container. During the transfer of the plastic parison into the blow mold, as mentioned above, transfer errors can occur, wherein a plastic parison gets clamped between the mold halves, for example, when the blow mold is being closed. In this case, the locking process can be disturbed.

The locking of the mold halves relative to one another is advantageously achieved by a locking flap. A first locking element of the locking mechanism, which is arranged on one of the two blow mold carriers, can pivot into a second locking element of the locking mechanism, which is arranged on the other mold carrier, and thus bring about the locking. This first locking element is preferably pivotable relative to a pivot axis running parallel to a longitudinal direction of the plastic preforms to be expanded.

When the blow mold is properly locked, the blow molding process is initiated. An improperly locked mold is detected with the sensor device described here (preferably INI or light barrier), and it is assumed that a plastic preform has probably become clamped and the blow mold has thus been improperly locked.

Within the scope of the invention, it is now proposed to not immediately initiate an emergency stop in this case (mold carrier not locked). Attempts are made to remove the plastic preform from the apparatus and, in particular, to remove it during the production process.

In a preferred embodiment, the apparatus has a control device controlling the apparatus taking into account the signal output by the first sensor device. This control device can, for example, instruct the apparatus or corresponding drives to no longer supply a further preform to a particular forming station when a fault has been detected in that particular forming station, at least during the next cycle, in particular, in order to prevent the blow-molding process for the duration of the fault.

Furthermore, the apparatus can, for example, cause a clamp on the outlet starwheel to eject the plastic preform, or however the plastic preform flies or is thrown out of the blow mold independently due to the centrifugal force when the forming station is open. This forming station is preferably not loaded with a plastic preform in the further course of production. The control device can cause an inspection round to be carried out. It is checked whether the forming station (in particular, when it is not loaded with a plastic preform) is now being properly locked again. It is possible to set the number of these inspection rounds.

If it is determined during an inspection cycle that the blow mold in question has been properly locked again, this station will be loaded again with a plastic preform in the next cycle and a container is blown. In the event of a properly blown container, production continues; it would also be possible here (as a precautionary measure) to eject this container.

For further production, only a few containers will thus not be available. However, if it was not possible to properly lock the mold, several inspection rounds can preferably be passed through, depending on the presetting. Only then will an improperly locked mold lead to an emergency stop and thus to a classic interruption of production.

However, it would also be conceivable that if a frequently occurring fault is detected in a particular forming station, this station will initially (during ongoing operation) no longer be loaded with plastic preforms and the fault in this forming station only be eliminated at a later point in time, during a planned stop of operation.

In a further advantageous embodiment, the locking mechanism has a guide cam arranged in a stationary manner, which guide cam interacts with a guide roller, wherein the guide roller preferably rolling over this guide cam. Particularly preferably, each forming station has at least one such guide roller. The guide cam is arranged in a stationary manner and the guide rollers of the individual forming stations roll over them. In this way, the said movements can be achieved, such as the opening and closing of the blow mold, the locking by means of the locking mechanism, but also possibly the movements of a blow nozzle which is placed on the plastic preforms, and/or the movement of the stretching rod mentioned above.

The movement mechanism therefore preferably also has a guide cam arranged in a stationary manner, which guide cam interacts with a guide roller, wherein preferably the guide roller rolls over this guide cam, in particular, to open and/or close the blow molds.

In a further advantageous embodiment, at least one sensor device is selected from a group of sensor devices including light barriers, proximity sensors, cameras, and the like. The sensor device is preferably a sensor device which is suitable for detecting the locking state in a contactless manner.

Particularly preferably, the sensor device is a light barrier which is suitable and intended to detect the passage of at least one element of the locking mechanism, in particular, a guide roller.

The sensor device is preferably arranged at or on a locking cam.

In a further preferred embodiment, a cleaning device for cleaning the sensor device is provided. It is thus possible, for example, for the cleaning device to be an application device, in particular a nozzle, which applies a flowable medium, in particular compressed air, to the sensor devices for the cleaning thereof.

In addition to or instead of the sensor device which detects the locking state, a sensor device which detects an or the closure state of the blow mold carrier could also be provided in order to conclude in this way that the blow molds are properly closed.

Preferably, such a sensor device is associated with each forming station. However, it would also be possible for a sensor device to be provided which is, for example, arranged in a stationary manner and detects proper locking of the forming stations transported past it.

In a preferred embodiment, the stationary sensor device to check the locking is arranged at the end of the locking cam.

The stationary sensor device is preferably suitable and intended to determine the position of the locking roller after leaving the cam. The correct contact of the roller on the can cannot be detected with designs according to the prior art.

In a further advantageous embodiment, the apparatus has an ejection device suitable and intended for ejecting a plastic preform processed by an improperly locked forming station. As mentioned above, this can be done, for example, by opening a gripping clamp which holds this plastic preform.

In a preferred embodiment, the apparatus has an identification device for identifying an improperly locked forming station. This identification can take place by such a sensor device being associated with each forming station. However, if only one or a few sensor devices are provided which detect the locking state of the forming stations transported past them, it would be possible for the identification device to detect data from the drive device of the carrier device on which the forming stations are arranged in order to identify the forming station in this way. In this way, the sensor device can, for example, detect the occurrence of a faulty locking, and the identification device can subsequently identify at which forming station this fault has occurred.

In a preferred embodiment, the control device is suitable and intended for at least temporarily not supplying any plastic preforms for the expansion thereof to a forming station in which a faulty locking has been detected. As mentioned above, the control device will cause at least one inspection cycle to be run after a fault has been detected, during which no plastic preform is fed to the relevant forming station and during which it is simultaneously detected whether this forming station closes or locks properly.

In a preferred embodiment, the apparatus has a counter device for counting the plastic containers formed by a particular forming station. The counter device is particularly preferably suitable and intended for counting the number of "good" containers produced for each forming station, in particular subsequent to an earlier fault.

This counter device is preferably configurable, or a limit value of this counter device is configurable. If this counter device or its specified value is exceeded, this can lead to a production stop in order to check the corresponding forming station for faults. This is relevant if fault conditions occur with a greater probability in certain forming stations. As mentioned, in this case it would however also be possible to temporarily switch off such a forming station in which a higher number of faults has been detected (during running operation) or to temporarily not supply any plastic preforms to said forming station.

An advantage of the invention is that such faults have no or hardly any influence to the line availability, since only individual containers are not available for production. In addition, significantly fewer costs arise with regard to the plastic preforms, since their rejection rate is significantly reduced. In addition, machine availability can also be increased. Furthermore, there is also less disposal material and also less manpower is tied with such a machine.

The present invention is furthermore directed to a method for forming plastic preforms into plastic containers, wherein the plastic preforms are transported by means of a rotatable carrier, on which a plurality of forming stations for forming the plastic preforms into the plastic containers are arranged, wherein the forming stations each have application devices which apply a flowable and in particular gaseous medium to the plastic preforms for the expansion thereof, and wherein the forming stations each have blow mold carriers, on which blow molds are arranged, within which the plastic preforms are formed into plastic containers and a first movement mechanism is provided for opening and/or closing the blow molds and wherein further a locking mechanism is provided which locks together the blow mold carriers (in particular, with the blow mold or blow mold parts arranged thereon) at least temporarily during the expansion process of the plastic preforms.

According to the invention, at least one sensor device is provided which detects a locking state of the locking mechanisms of at least one forming station and which outputs at least one signal which is characteristic of this locking state.

Particularly preferably, a control device controls the apparatus also taking this signal into account.

In a further preferred method, a forming station which has not been properly locked is identified and this forming station is at least temporarily not fed any plastic preforms.

In a further preferred method, a plastic preform to be formed by an improperly locked forming station is ejected.

In a further preferred method, the opening and/or closing movement of the forming stations and/or the locking and/or unlocking are effected by means of a stationary guide cam.

Further advantages and embodiments result from the accompanying drawings.

DETAILED DESCRIPTION OF THE INVENTION

Figures 1, 2:
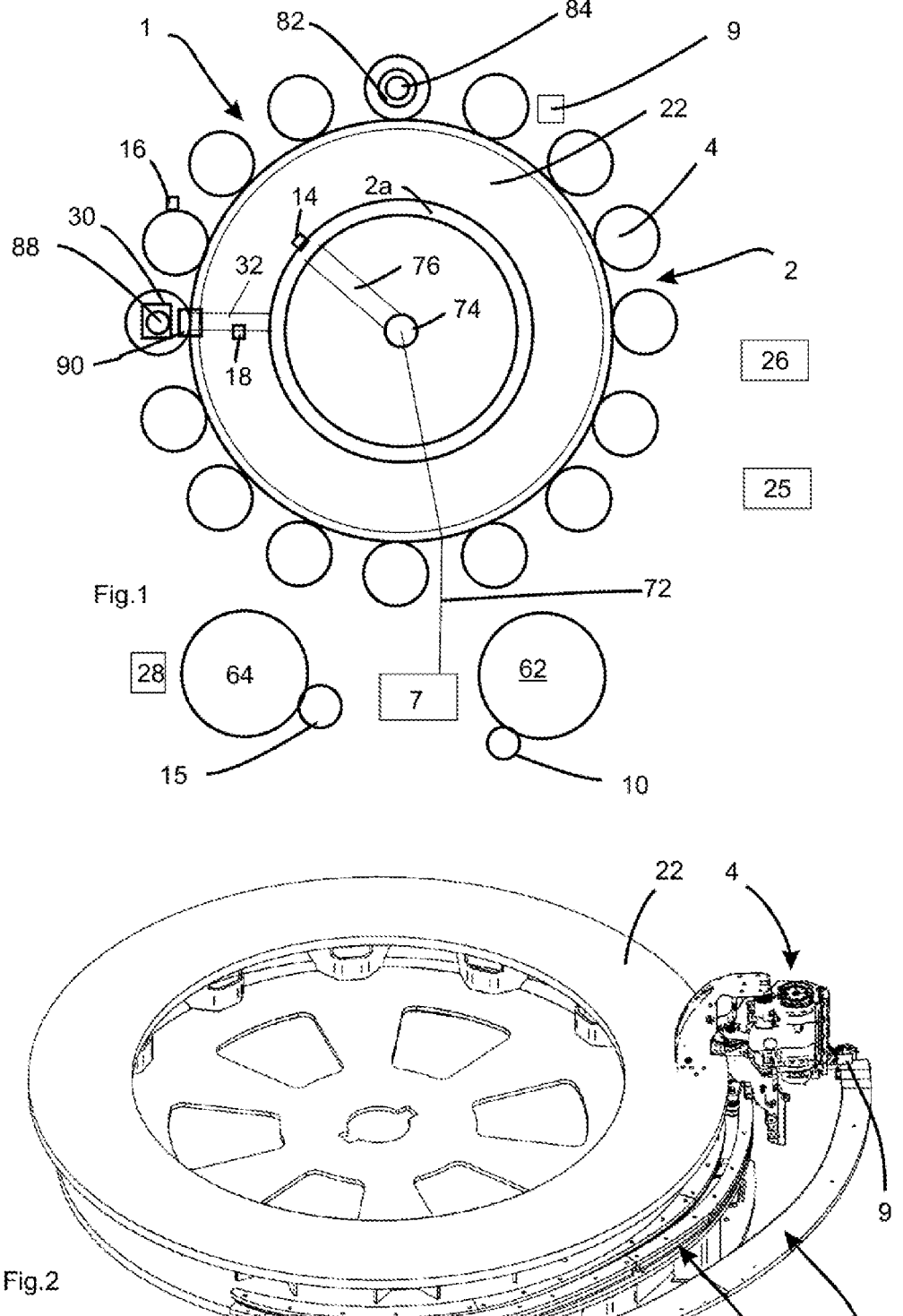
FIG. 1 shows a schematic representation of an apparatus according to the invention.
FIG. 2 shows a detailed view of an apparatus according to the invention.

FIG. 1 shows a schematic representation of an apparatus according to the invention for forming plastic preforms into plastic containers. A supply device 62, such as a transport wheel, is provided here, which supplies the plastic preforms 10 to be formed to the actual forming station or the forming stations 4. These forming stations 4 are arranged on a rotatable carrier 22.

The reference number 2 denotes the forming device in its entirety. The reference number 84 denotes, schematically, an application device which supplies compressed air to the plastic preforms arranged in a blow mold 82 in order to expand said plastic preforms.

The reference number 88 denotes a stretching rod which can be inserted into the plastic preforms. In addition, a valve block can be provided having a plurality of valves by means of which the pressurization of the plastic preforms is controlled.

The reference number 16 denotes, schematically, a sensor device which detects a proper locking state of the individual forming stations.

Starting from a compressed air source 7, such as a compressor, compressed air is guided via a compressed air line 72 to a distributor, such as a rotary distributor 74. From there, several compressed air reservoirs 2a (only one is shown), which are designed in particular as annular ducts, are each supplied with compressed air via connecting lines 76. The reference number 14 denotes a pressure measuring device which measures an air pressure within the annular duct 2a.

Several pressure levels are supplied to the individual forming stations 4 via a plurality of connecting lines 32. The reference number 18 denotes a further pressure gauge.

The produced plastic bottles 15 are discharged via a discharge device 64. A control device 28 can be provided in this region, which control device 28 ejects faulty plastic preforms and, in particular, such plastic preforms that were in forming stations that did not properly lock.

The reference number 52 denotes a guide cam (shown only schematically), which causes the individual blow molds of the forming stations 4 to close. The reference number 54 denotes a further guide cam which causes the blow mold to be locked, in particular, after it has been closed. Preferably, after the forming stations have passed this guide cam 54 or are in a state in which they should be locked, this locking state is queried or checked. If a particular blow mold is not properly locked, the corresponding forming station is preferably controlled such that a blow molding process does not take place. The plastic parison located on or in this forming station is thus not formed.

The reference number 25 denotes a control device which controls the entire apparatus. This control device can, for example, control that a forming station, which has not properly locked, is not supplied with a plastic preform in a further cycle.

The reference number 26 denotes a counting device which is suitable and intended for counting, for example, the number of rejects or the number of improper lockings for each individual forming station. A count can also be made of how many plastic preforms a particular forming station has properly produced in a certain period of time. The reference number 9 roughly schematically denotes a sensor device for detecting a locking state.

FIG. 2 shows a detailed view of the apparatus shown in FIG. 1. Here, the rotatable carrier 22 and a forming station 4 arranged on this carrier 22 (further forming stations are not shown) are shown.

The reference number 40 schematically denotes a movement mechanism which serves to open the blow molds. For this purpose, one or more guide cams are provided which, in conjunction with at least one guide roller arranged on the forming station, cause the blow mold to close.

The reference number 60 denotes a locking mechanism or a part of such a locking mechanism, namely a further guide cam.

The reference number 9 denotes a preferably stationary sensor device which serves to detect proper locking. This sensor device 9 is preferably arranged on the locking cam and, in particular, at the end of this locking cam.

Figure 3:
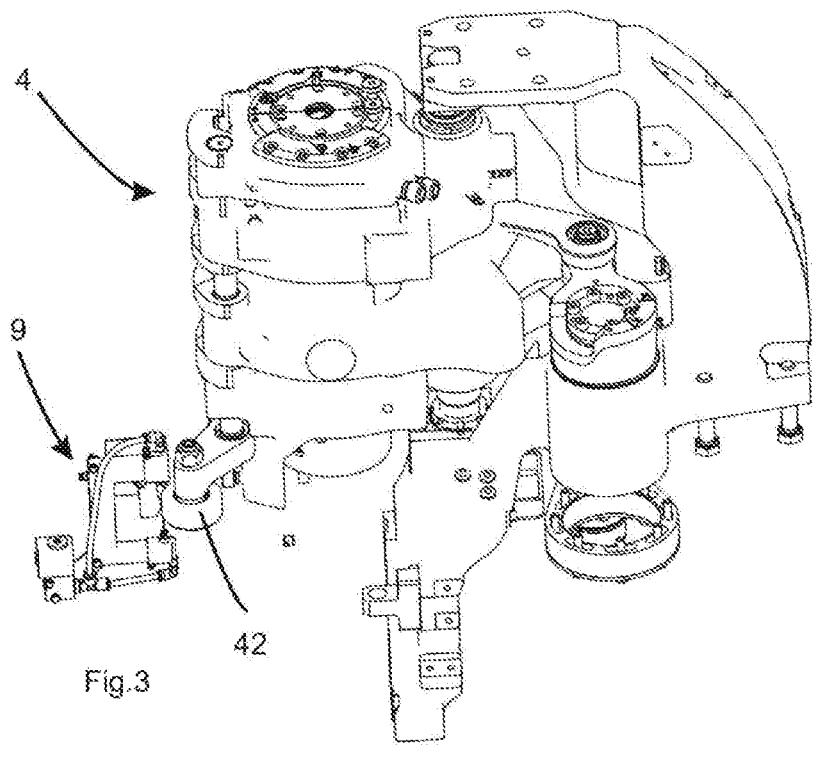
FIG. 3 shows a representation of a forming station and a sensor device.

FIG. 3 shows a further representation of a forming station 4 and of the sensor device 9. The reference number 42 denotes a guide roller which also forms a component of the locking mechanism. The sensor device 9 is here a light barrier unit which preferably detects a position of this guide roller.

Figure 4:
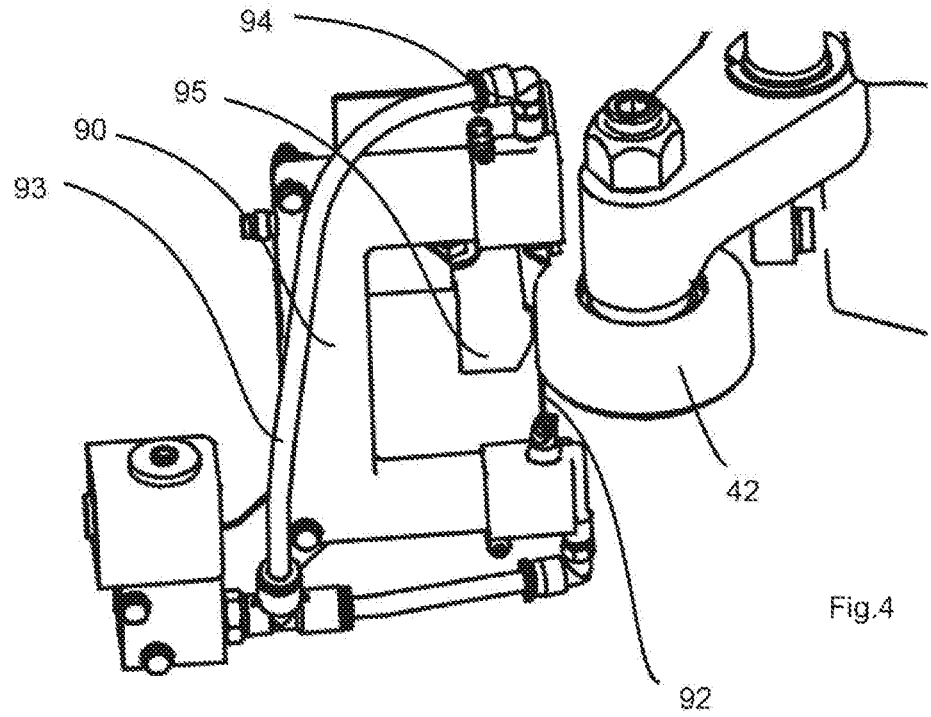
FIG. 4 shows a detail of the representation shown in FIG. 3.

FIG. 4 shows a more detailed representation of this sensor device 9. This sensor device has a C-shaped carrier 90 on which the light barrier unit 92 is formed. This light barrier unit may have a light source and a sensor which can detect the passage of the guide roller. If the light beam of the light barrier unit is not interrupted, the corresponding forming station 4 will not have been properly locked. The sensor device and in particular also the carrier 90 are preferably arranged at an outlet of the locking cam (not shown in FIG. 4).

The reference number 94 denotes a cleaning device for cleaning the sensor device, in particular a receiver of the sensor device. The reference number 93 denotes a compressed air line for supplying the cleaning device with compressed air for cleaning the sensor device.

The reference number 95 denotes an adjustment device and in particular an adjustment plate in order to adjust a distance between the sensor device 9 and the guide roller. In particular, the sensor device can thereby be adjusted.

The applicant reserves the right to claim all features disclosed in the application documents as essential to the invention, provided that they are novel over the prior art individually or in combination. It is also pointed out that features which can be advantageous in themselves are also described in the individual figures. The person skilled in the art will immediately recognize that a particular feature described in a figure can be advantageous even without the adoption of further features from this figure. Furthermore, the person skilled in the art will recognize that advantages can also result from a combination of several features shown in individual or in different figures.

The invention claimed is:

1. An apparatus for forming plastic preforms into plastic containers comprising a rotatable carrier on which a plurality of forming stations for forming the plastic preforms into plastic containers are arranged, wherein the forming stations each have application devices configured for applying a flowable medium to the plastic preforms for the expansion thereof, and wherein the forming stations each have blow mold carriers on which blow molds can be arranged, within which the plastic preforms can be formed into plastic containers and a first movement mechanism is provided configured for opening and/or closing the blow molds and wherein further a locking mechanism is provided configured for locking the blow mold carriers together at least temporarily during the expansion process of the plastic preforms, wherein the apparatus has at least one sensor device which is configured to detect a locking state of the locking mechanism of at least one forming station and which is configured to output at least one signal which is characteristic of this locking state, and wherein the apparatus has an ejection device which is configured for ejecting a plastic preform treated by an improperly locked forming station.

2. The apparatus according to claim 1, wherein the apparatus has a control device configured to control the apparatus while taking into account the signal output by the first sensor device.

3. The apparatus according to claim 1, wherein the locking mechanism has a guide cam arranged in a stationary manner, which guide cam is configured to interact with a guide roller, wherein the guide roller is configured to roll over this guide cam.

4. The apparatus according to claim 1, wherein the at least one sensor device is selected from a group of sensor devices consisting of light barriers, proximity sensors and cameras.

5. The apparatus according to claim 1, wherein the apparatus has an identification device configured for identifying an improperly locked forming station.

6. The apparatus according to claim 2, wherein the control device is configured for at least temporarily not supplying any plastic preforms for the expansion thereof to a forming station in which a faulty locking has been determined.

7. The apparatus according to claim 1, wherein the apparatus has a counting device configured for counting the plastic containers formed by a particular forming station.

8. The apparatus according to claim 1, wherein the apparatus has at least one cleaning device configured for cleaning the sensor device.

9. The apparatus according to claim 8, wherein the cleaning device has at least one application device which is configured to apply a flowable medium and compressed air to the sensor device.

10. A method for forming plastic preforms into plastic containers, wherein the plastic preforms are transported by a rotatable carrier, on which a plurality of forming stations for forming the plastic preforms into the plastic containers are arranged, wherein the forming stations each have application devices which apply a flowable medium to the plastic preforms for the expansion thereof, and wherein the forming stations each have blow mold carriers, on which blow molds are arranged, within which the plastic preforms are formed into plastic containers and a first movement mechanism is provided for opening and/or closing the blow molds and wherein further a locking mechanism is provided which locks the blow mold carriers together at least temporarily during the expansion process of the plastic preforms, wherein at least one sensor device is provided which detects a locking state of the locking mechanisms of at least one forming station and which outputs at least one signal which is characteristic of this locking state, and wherein a plastic preform to be formed by an improperly locked forming station is ejected.

11. The method according to claim 10, wherein a forming station which has not been properly locked is identified and at least temporarily no plastic preforms are supplied to this forming station.

12. The method according to claim 10,
wherein
the opening and/or closing movement of the forming stations and/or the locking and/or unlocking are effected by a stationary guide cam.

13. An apparatus for forming plastic preforms into plastic containers comprising a rotatable carrier on which a plurality of forming stations for forming the plastic preforms into plastic containers are arranged, wherein the forming stations each have application devices configured for applying a flowable medium to the plastic preforms for the expansion thereof, and wherein the forming stations each have blow mold carriers on which blow molds can be arranged, within which the plastic preforms can be formed into plastic containers and a first movement mechanism is provided configured for opening and/or closing the blow molds and wherein further a locking mechanism is provided configured for locking the blow mold carriers together at least temporarily during the expansion process of the plastic preforms,
wherein
the apparatus has at least one sensor device which is configured to detect a locking state of the locking mechanism of at least one forming station and which is configured to output at least one signal which is characteristic of this locking state, and wherein
the apparatus has a counting device configured for counting the plastic containers formed by a particular forming station.

14. The apparatus according to claim 13,
wherein
the apparatus has a control device configured to control the apparatus while taking into account the signal output by the first sensor device.

15. The apparatus according to claim 13,
wherein
the locking mechanism has a guide cam arranged in a stationary manner, which guide cam is configured to interact with a guide roller, wherein the guide roller is configured to roll over this guide cam.

16. The apparatus according to claim 13,
wherein
the at least one sensor device is selected from a group of sensor devices consisting of light barriers, proximity sensors and cameras.

17. The apparatus according to claim 13,
wherein
the apparatus has an identification device configured for identifying an improperly locked forming station.

18. The apparatus according to claim 14,
wherein
the control device is configured for at least temporarily not supplying any plastic preforms for the expansion thereof to a forming station in which a faulty locking has been determined.

19. The apparatus according to claim 13,
wherein
the apparatus has at least one cleaning device configured for cleaning the sensor device.

20. The apparatus according to claim 19,
wherein
the cleaning device has at least one application device which is configured to apply a flowable medium and compressed air to the sensor device.

* * * * *